United States Patent [19]
Schlagel et al.

[11] Patent Number: 5,855,104
[45] Date of Patent: Jan. 5, 1999

[54] AUTOMATED APPARATUS AND METHOD FOR CONSOLIDATING PRODUCTS AND PACKAGING

[75] Inventors: Mark Schlagel; Russell J. Edwards; Mary L. Dolan, all of Jacksonville, Fla.; Svend Christensen, Olsker; Borge P. Gundersen, Tikob, both of Denmark; John M. Lepper, Jacksonville, Fla.; Daniel Tsu-Fang Wang, Jacksonville, Fla.; Richard W. Abrams, Jacksonville, Fla.; Thomas C. Ravin, Helsignor, Denmark

[73] Assignee: Johnson & Johnson Vision Products, Inc., Jacksonville, Fla.

[21] Appl. No.: 811,140

[22] Filed: Mar. 3, 1997

Related U.S. Application Data

[63] Continuation of Ser. No. 536,851, Sep. 29, 1995, abandoned, which is a continuation-in-part of Ser. No. 257,791, Jun. 10, 1994, Pat. No. 5,528,878.

[51] Int. Cl.$^6$ ........................................................ B65B 57/00
[52] U.S. Cl. .................................... 53/54; 53/543; 53/495
[58] Field of Search ............................. 198/462.1, 462.3, 198/418.5; 53/54, 247, 493, 495, 497, 543; 414/902; 209/576, 577, 587, 651, 656, 934

[56] References Cited

U.S. PATENT DOCUMENTS

| | | | |
|---|---|---|---|
| 4,610,347 | 9/1986 | Inoko | 198/418.5 |
| 4,641,271 | 2/1987 | Konishi et al. | 414/902 |
| 4,642,967 | 2/1987 | Culpepper | 53/543 |
| 4,805,778 | 2/1989 | Nambu | 209/938 |
| 4,907,701 | 3/1990 | Kobayashi et al. | 209/576 |
| 5,035,105 | 7/1991 | Qvarnstrom | 53/543 |
| 5,175,692 | 12/1992 | Mazouz et al. | 414/902 |
| 5,190,428 | 3/1993 | Bryant et al. | 53/251 |

Primary Examiner—James F. Coan
Assistant Examiner—Gene L. Kim

[57] ABSTRACT

An automated apparatus for controlling the automatic packaging of contact lenses in a contact lens fabrication facility includes: a first robotic transfer device for periodically transferring a first predetermined amount of individual packages from an inspection station to an intermediate consolidation buffer and depositing the packages on the consolidation buffer; a control device for tracking and identifying each individual contact lens conveyed from the inspection station to the consolidation buffer and including memory and logic circuits for storing the identity of individual packages containing contact lenses that have been previously determined at the inspection station as being out of specification, and, generating a signal to enable the first robotic device to discard any individual package identified as out of specification; and; a second robotic assembly for periodically transferring a second predetermined amount of individual packages from the consolidation buffer to a second processing station, the control device enabling the first robotic device to provide a sufficient amount of individual packages to the consolidation buffer to enable the second robotic assembly to continuously transfer the second predetermined amount of packages to the second processing station in every period.

17 Claims, 11 Drawing Sheets

AUTOMATED APPARATUS AND METHOD FOR CONSOLIDATING PRODUCTS AND PACKAGING

CROSS REFERENCE TO RELATED APPLICATIONS

This application is a continuation of application Ser. No. 08/536,851 filed Sep. 29, 1995, now abandoned which is a continuation-in-part of copending U.S. patent application entitled AUTOMATED APPARATUS AND METHOD FOR CONSOLIDATING PRODUCTS FOR PACKAGING, having Ser. No. 08/257,791 now U.S. Pat. No. 5,528,878 filed Jun. 10, 1994.

FIELD OF THE INVENTION

The present invention relates generally to the field of manufacturing ophthalmic lenses, especially molded, hydrophilic contact lenses, and more specifically to an automated apparatus for consolidating contact lenses for packaging after inspection thereof.

DESCRIPTION OF THE PRIOR ART

The molding of hydrophilic contact lenses is disclosed in U.S. Pat. No. 4,495,313 to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art references disclose a contact lens production process wherein each lens is formed by sandwiching monomer or monomer mixture between a front curve (lower) mold section and back curve (upper) mold section, carried in a two by four mold array. The monomer is polymerized, thus forming a lens which is then removed from the mold sections and further treated in a hydration bath and packaged for consumer use.

U.S. Pat. Nos. 5,080,839 and 5,094,609 disclose respectively a process for hydrating contact lenses and a chamber for hydrating contacts lenses formed with a monomer or monomer mixtures disclosed in the forgoing patents. The process disclosed in these patents significantly reduce the thruput time by hydrating the lens and releasing the lens from the mold cavity with deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then seal the lens within the package so that the final lens equilibrium (ionic neutralization, final hydration and final lens dimensioning) is accomplished in the package at room temperature or during sterilization.

U.S. Pat. No. 4,961,820, also assigned to the assignee of the present invention, discloses a final package for a contact lens, wherein the package is formed from a transparent plastic material such as polypropylene and a foil laminate that is heat sealed thereto.

While U.S. Pat. No. 5,080,839 and 5,094,609 contemplate that the entire hydration process and transfer to final packaging may take place in a fully automated fashion, and while the chamber and process described in the foregoing patents enabled automated handling of the lens during hydration, suitable automated equipment to inspect and handle the lenses at high production rates and implement the methods thereof in a fully automated apparatus was not readily available or taught by the prior art.

SUMMARY OF THE INVENTION

Recent developments in the inspection of contact lenses produced in accordance with the foregoing methods has enabled automated lens inspection, as taught in U.S. Ser. No. 08/994,564 entitled "Lens Inspection Method and Apparatus", (VTN 0037) assigned to the assignee of the present invention. Further, recent developments in the hydration and automated handling of wet contact lenses, as taught in U.S. Ser. No. 08/258,556 "Automated Method and Apparatus for Hydrating Soft Contact Lenses" (Docket 8998), also assigned to the assignee in the present invention, has enabled automatic robotic handling of lenses during hydration, and prior to the inspection thereof by the automated lens inspection system.

The removal of lenses, that are out of product specification, from a serial product stream of contact lenses, generates random variations in the product flow which must be consolidated prior to packaging.

The present invention therefor provides an automated apparatus for consolidating serial product flow wherein the product flow includes random variations in the flow. The present invention provides a consolidation buffer for receiving the serial products from the production line, and then consolidating random variations in the product flow. The automated robotic handling means then selects a predetermined number and arrangement of product units and transports that number and arrangement to a subsequent packaging station for packaging, sterilization, and final shipment.

It is further an object of the present invention to provide a robotic transfer means for receiving serial product flow, and selectively ejecting individual product units in response to data signals from the automated lens inspection system.

It is further an object of the present invention to provide a consolidation buffer between two serial production operations, wherein the number and arrangement of product varies between input and output. The present invention enables use of a first x,y array of product units merging from a serial production line, and consolidating those product units into a second x,y array of units which corresponds to an array used in second production operation relating to the product.

It is further an object of the present invention to provide a programmable logic controller which maintains a status count for each of the individual products in the consolidation buffers of the present invention, including a count for each random addition of product, and a separate count for each selection and transport of product from the buffers to the final packaging station. It is another object of the present invention to provide a method and apparatus for the high speed robotic handling of discrete final packages of product having a soft contact lens carried therein. This robotic handling enables selective ejection or rejection of specific lenses, even when carried in a predetermined X,Y array, when one or more of said lenses have been flagged as flawed or out of spec by the automated lens inspection system.

It is another object of the present invention to provide an automated control means for sequencing and coordinating each of the robotic assemblies used in the transfer of lenses from the automated lens inspection system to final packaging.

While the invention is described with particular reference to molded contact lenses wherein the lens has been molded between a first and second mold half, as described in U.S.

Ser. No. 08/258,654 "Consolidated Contact Lens Molding" (Docket 9016) it is understood the present consolidation apparatus is equally suitable for the consolidation of lenses formed by lathe cutting wherein the hydrogel is maintained at a dry state while the desired optical surfaces are cut and polished. Further, the apparatus of the present invention may also be used in consolidating spin cast lenses which subject a liquid monomer to centrifugal force in a mold which has the same shape as the desired optical surfaces of the lens.

BRIEF DESCRIPTION OF THE DRAWINGS

The foregoing objects and advantages of the present invention for an automated apparatus and method for consolidating products for packaging may be more readily understood by one skilled in the art with reference being had to the following detailed description of the preferred embodiments, taken in conjunction with the accompanying drawings, wherein like elements are designated by identical reference numerals throughout the several views, and in which.

DETAILED DESCRIPTION OF THE PREFERRED EMBODIMENTS

Figure 1:
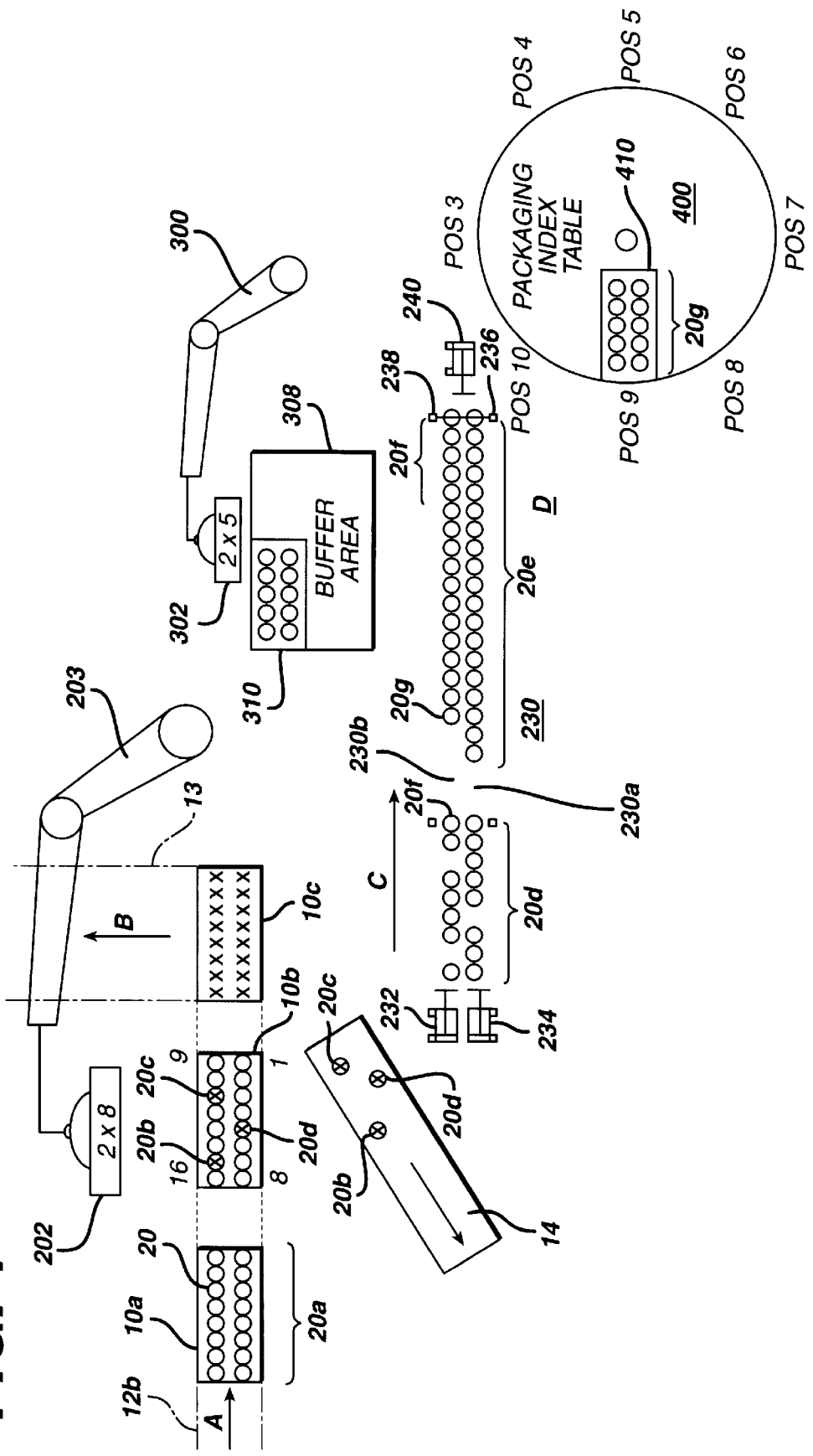
FIG. 1 is a diagrammatic illustration of plural robotic handling means, and a consolidation buffer for removing random variations in product flow.
Figure 2:
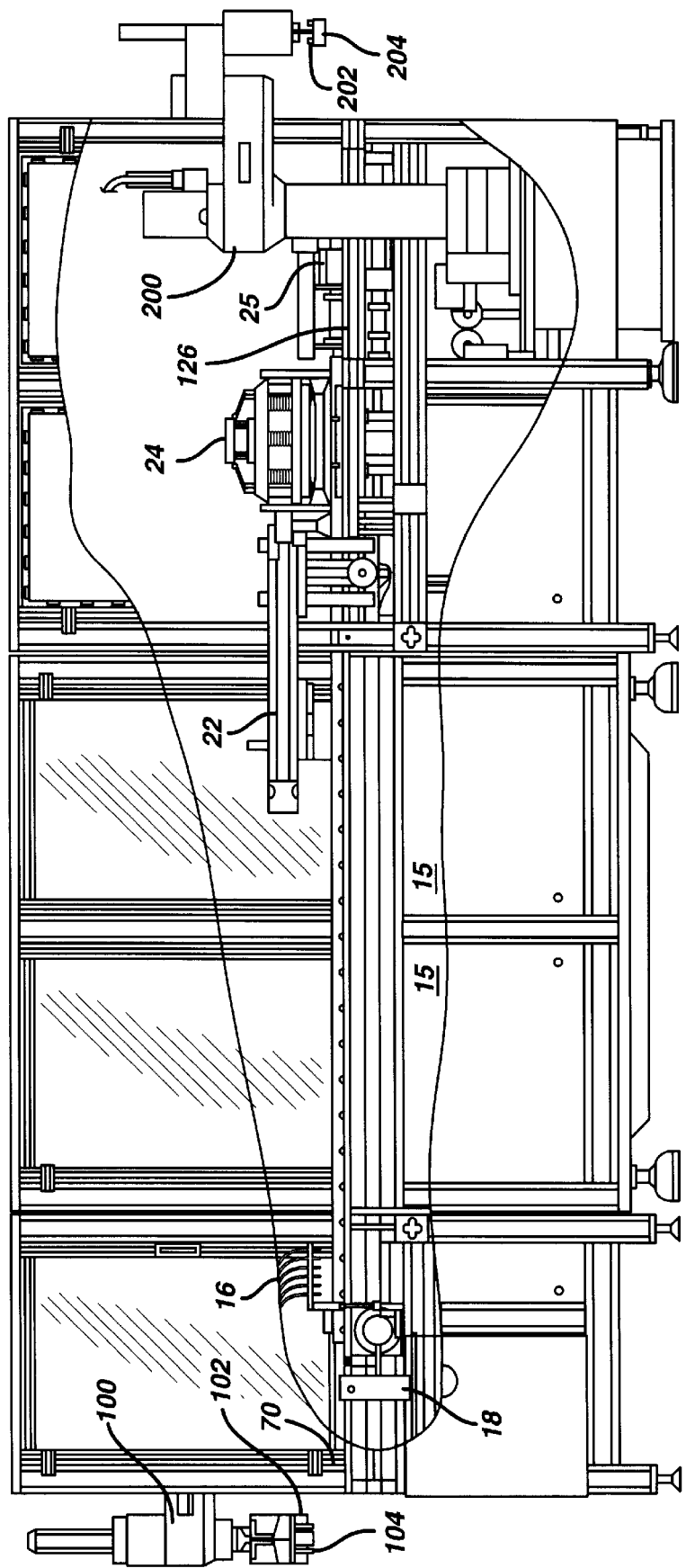
FIG. 2 is an elevation view of the automated lens inspection system and the stations utilized in the initial handling of the lenses prior to the automated lens inspection.

FIG. 1 is a diagrammatic illustration of the automated apparatus of the present invention used to consolidate serial product flow when the serial product flow has random variations therein. While prefigured 2×8, 2×5 and 4×8 arrays are used in the description of the present invention, it is understood that a variety of arrays and configurations may be used in the practice of the invention described herein.

As illustrated in FIG. 1, an inspection pallet 10 carrying sixteen product articles 20, arranged in a 2×8 array 20 (a) is transported in the direction of arrow A from an automated inspection system that has separately reviewed each of the products 20 according to a predefined product criteria. Pallet 10 travels on a conveyor 12(b) through each of the three positions 10 (a), (b) and (c) illustrated in FIG. 1. After the products have been removed from the inspection pallet 10, as indicated in 10(c), the empty inspection pallets are returned via return conveyor 13 to be refilled with product.

A robotic handling device 200 is positioned adjacent conveyors 12, 13 and has mounted thereon a 2×8 vacuum array 202 having sixteen independently actuable vacuum gripping means mounted thereon. Pallet 10(b) is conveyed along conveyor 12 to a predetermined product pick point, as illustrated in FIG. 1 and the 2 ×8 array 202 is positioned thereabove to remove each of the sixteen products from the inspection carrier 10(b). As illustrated in FIG. 1, products 20(b),(c) and (d) have been marked with an "X" to diagrammatically illustrate the removal of flawed or out spec products. In the practice of the present invention, a programmable logic controller is used to control the various elements of the present invention and receives a datablock from the automated inspection system having a flag set for each of the products 20(b), (c) and (d) that are flawed or out of spec.

After the products 20 have been removed from the inspection carrier 10(b), the robotic transfer device 200 positions the 2×8 array over conveyor belt 14 and selectively discharges the products 20(b), (c) and (d). Those products are then removed by conveyor 14 for subsequent destruction or recycling.

The robotic device 200 then places the remaining products on a vacuum consolidation buffer 230 as indicated at 20(d). The product array as deposited at 20(d) includes gaps or random variations in the product flow resulting from the removal of the out of spec products 20(b), (c) and (d) from the serial product flow. The consolidation buffer 230 includes a pair of pneumatic product followers 232,234 which are used to consolidate the product group 20(d) with product group 20(e). Each of the pneumatic followers 232, 234 is independently advanced in the direction of arrow C until the product stream is consolidated. One or more pneumatic followers may be used to consolidate and advance the array along the consolidated buffer. As product 20(f) encounters product 20(g), the entire stream of product driven by the pneumatic product followers will advance and trigger an optical sensor 236, which generates a control signal for the programmable logic controller to de-energize the pneumatic product follower and return the follower to the initial start position. Likewise, optical sensor 238 generates a similar return signal for the other pneumatic product follower when the second product stream has been consolidated. After consolidation of the product, a separate indexing mechanism 240 returns the entire product stream in the direction of arrow D to a predetermined registration point for subsequent robotic handling. In the present invention, the consolidation buffer 230 includes both moveable and fixed guide rails which permit sliding movement of the product along the rails in response to product followers 232,234, but which will prevent "shingling" of the product during consolidation.

A package feed robotic handling device 300 is positioned between the consolidation buffer 230 and a packaging station 400, and is equipped with an array 302 which contains ten vacuum gripping means arranged in a 2×5 matrix. The 2×5 array 302 is first positioned over product group 20(f) and the vacuum gripping means is actuated to withdraw the first ten products from the vacuum consolidation rail 230. The packaging robotic handling device 300 then positions the 2×5 array and product group 20(*f*) over position 1 on the packaging indexing table 400, and drops the array of products onto support pallet 410 mounted on the packaging indexing table 400. For the purposes of illustrating the operation of the invention, only a single support pallet 410 is illustrated on the packaging indexing table 400, although it is understood that in actual practice eight such support pallets are provided, one for each index position. The ten product units 20 (*g*), carried by support pallet 410 are then indexed to position 2 for product verification, and to position 3 for subsequent product packaging operations.

During packaging, the packaging index table 400 rotates support pallets 410 from position to position to enable the products to undergo subsequent packaging steps. In the event there is a malfunction or delay in the operation of the packaging indexing table 400, the incoming product arriving on consolidation buffer 230 is temporarily stored in a buffer area 308 which has a plurality of buffer pallets 310 positioned therein. When the packaging index table 400 resumes operation, the package robotic handling device 300 will then transfer products in the 2×5 arrays from the buffer pallets 310 to the support pallets 410 on a first-in, first-out basis.

If the product being handled is time sensitive, the programmable logic controller can generate a time stamp to be placed with each product array as it is transferred from any given processing station to any subsequent processing station. Thus, a time stamp may be placed on the product when inspected, or when transferred to the buffer area 308. If the product is transferred to buffer 308, the X,Y coordinates of the array are also stored with the time stamp. If the time sensitive allotment expires before packaging index table 400 has resumed operation, the packaging robotic handling device 300 will then discard expired time sensitive product, and will transfer only product meeting the time sensitive criteria to the support pallet 410. Likewise, if a problem in the production line results in an inordinate number of products being rejected, so that less than five products are available on either consolidation string 230 (*a*), (*b*) at position 20(*e*) then the robotic handling device 200 will transfer product as necessary to balance product streams on both sides of the packaging consolidation buffer 230, and thereby enable removal of product as a 2×5 product array.

POST HYDRATION PROCESSING

The present invention was designed for and is particularly adapted for use in the post hydration processing section of an automated contact lens production facility. Contact lenses molded in an automated production line, such as that described in co-pending application U.S. Ser. No. 08/258,654 entitled "Consolidated Contact Lens Molding"; hydrated in a hydration system as described in U.S. Ser. No. 08/258,556, entitled "Automated Method and Apparatus for Hydrating Soft Contact Lenses"; and automatically inspected as described in U.S. Ser. No. 08/994,564 entitled "Lens Inspection Method and Apparatus" are particularly well suited for consolidation and packaging by the present invention.

Figure 6:
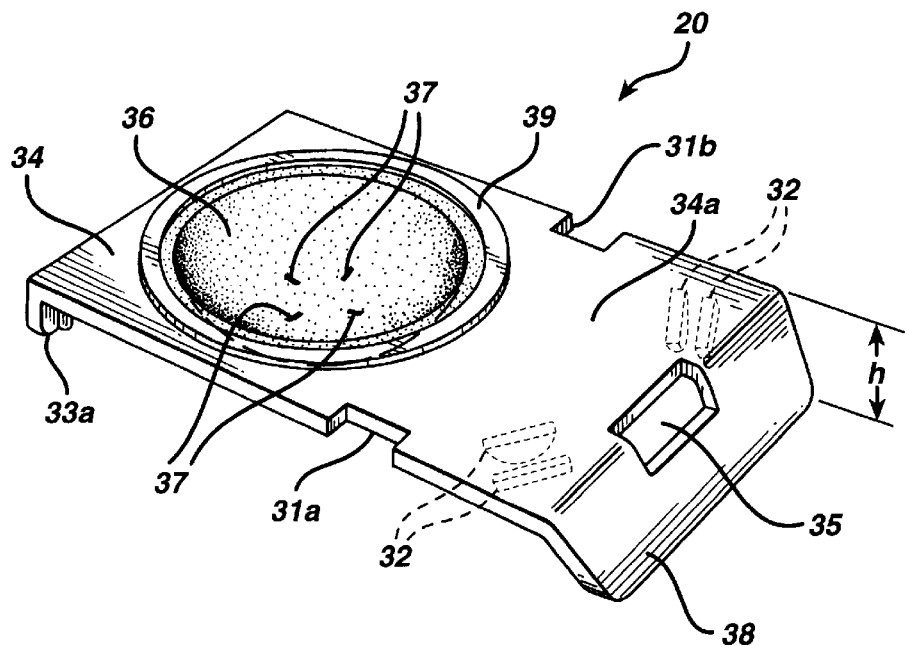
FIG. 6 is an isometric view of a contact lens carrier which serves as both an inspection carrier, and a portion of the final contact lens package.

The present invention envisions a multi-purpose disposable lens package carrier which transports a contact lens during inspection thereof, and serves as a portion of the final packaging after inspection. Package carrier 20 is illustrated in FIG. 6 and is formed from injection molded or thermal formed plastic sheet material, such as polypropylene and includes a planar essentially rectangularly shaped base member 34 having an angularly depending wall portion 38 at one end thereof forming a first flange member and a pair of registration flanges 33(*a*),33(*b*), one of which is visible in FIG. 6, at the other end thereof which are used to align the package carrier for robotic handling. This package carrier is more fully described in copending application U.S. Ser. No. 995,607, the disclosure of which is incorporated here by reference thereto. Registration notches 31(*a*), (*b*) are provided on either side of the base 34 to cooperate with registration pins on various support pallets used in the processing and packaging operations to register the package carrier and lens for further handling or treatment. Offset from the center of the package is a cavity 36 integrally formed therein which is of an essentially semi-spherical configuration, generally in conformance with a curvilinear shape of a contact lens (not shown) which is adapted to be stored therein in a sealed condition while immersed in a suitable sterile aqueous solution in a manner similar to that described in U.S. Pat. No. 4,691,820 to Martinez; which is assigned to the assignee of the present invention, the disclosure of which being incorporated herein by reference thereto. The height "h" of flange member 38 depending from the planar base member 34 is complimentary to the height or depth of cavity 36, and provides for self alignment of the package carrier in cooperation with depending flanges 33(*a*), (*b*) on specially configured pallet carriers, as will hereinafter be described. Depending flange 38 is also used in the final packaging of the product in cooperation with a plurality of generally "chevron-shaped" ridges 32, which will assist the end user in gripping the package while peeling open a foil laminate cover.

The cavity 36 also includes a plurality of tick marks 37 which are used to assist in holding a contact lens in the centered position in the cavity during the removal of deionized water at one of the post hydration processing stations. The package carrier is also equipped with an annular flange 39 which is used for heat sealing a foil laminate cover in order to provide a hermetic seal for the contact lens during final distribution. A cut-out 35 may optionally be provided to facilitate gripping the flange 38 and the package when the cover stock or foil laminate is removed for consumer usage.

Base member 34 also includes a smooth planar surface 34(*a*) to provide a suitable engagement zone for vacuum grippers on the upper side, and a vacuum rail on the lower side, which are used to transport the package carrier during various stages of the operation.

Figure 7:
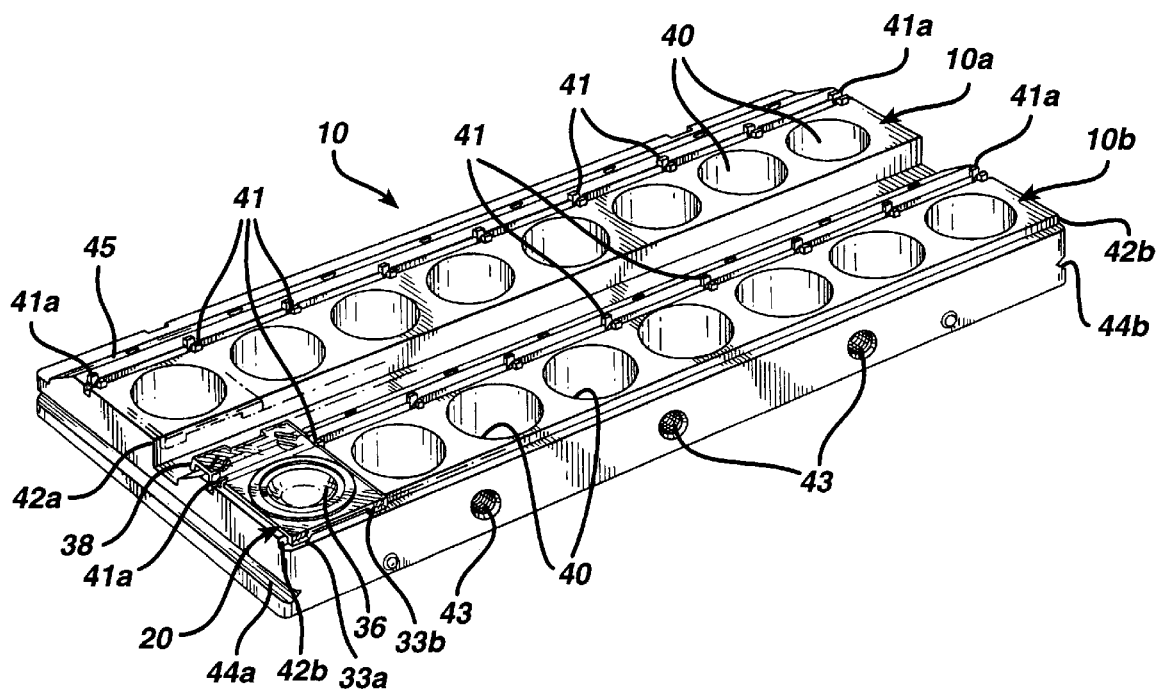
FIG. 7 is an isometric view of an inspection carrier used to transport a plurality of the contact lens carriers illustrated in FIG. 6 through the automated lens inspection system.

An inspection carrier for transporting the package carriers through the automated lens inspection system is illustrated in FIG. 7. The inspection carrier 10 includes a first and second row 10 (*a*), 10 (*b*) of cavities 40 which receive the bowl 36 of the package carrier and provide an optical sight path for the automated lens inspection system. Each of the intermediate registration pins 41 engage a package carrier on either side, with the end registration pins 41(*a*) engaging a single package. These registration pins provide for precise registration of the package carrier in the longitudinal dimension of the inspection carrier while a pair of hard edges 42(*a*),42(*b*) provide a reference surface for the downwardly descending flanges 33(*a*),33(*b*), which together with pins 41 register the carrier package against rotational skewing. The inspection pallet 10 is further provided with three registration openings 43 on either side of the pallet which are used to transport the pallet through the automatic lens inspection station and to lock the pallet in place during loading and unloading of the package carriers. The inspection pallet is further provided with a pair of grooves 44(*a*),44(*b*) which provide a positive grip for an overhead transport mechanism that places and then removes the inspection pallet from the automatic lens inspection system. A pair of slanted faces 45 provide clearance for the downwardly descending flange member 38 of the package carrier 20.

Figure 3:
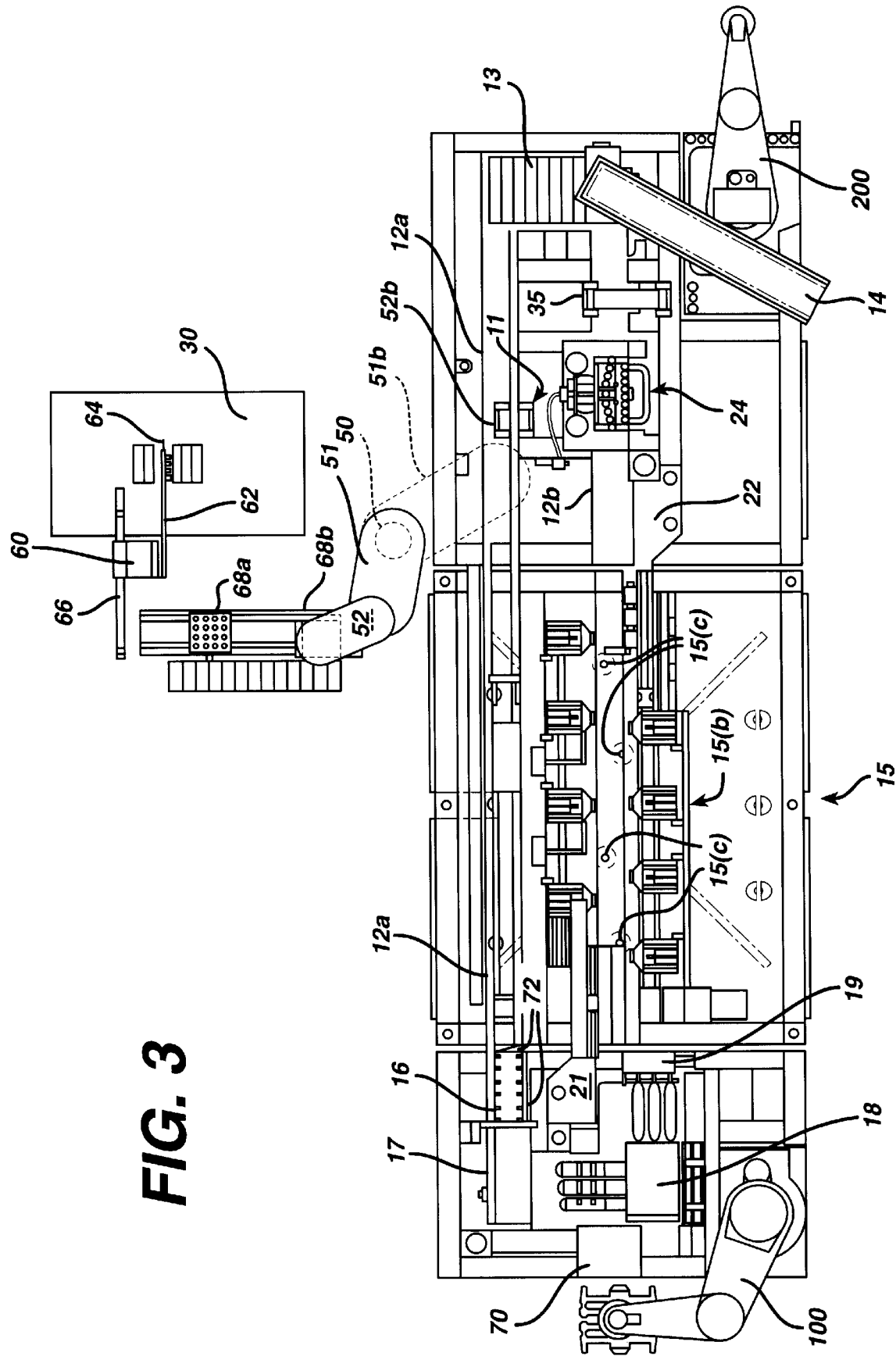
FIG. 3 is a plan view of the apparatus illustrated in FIG. 2.
Figure 4:
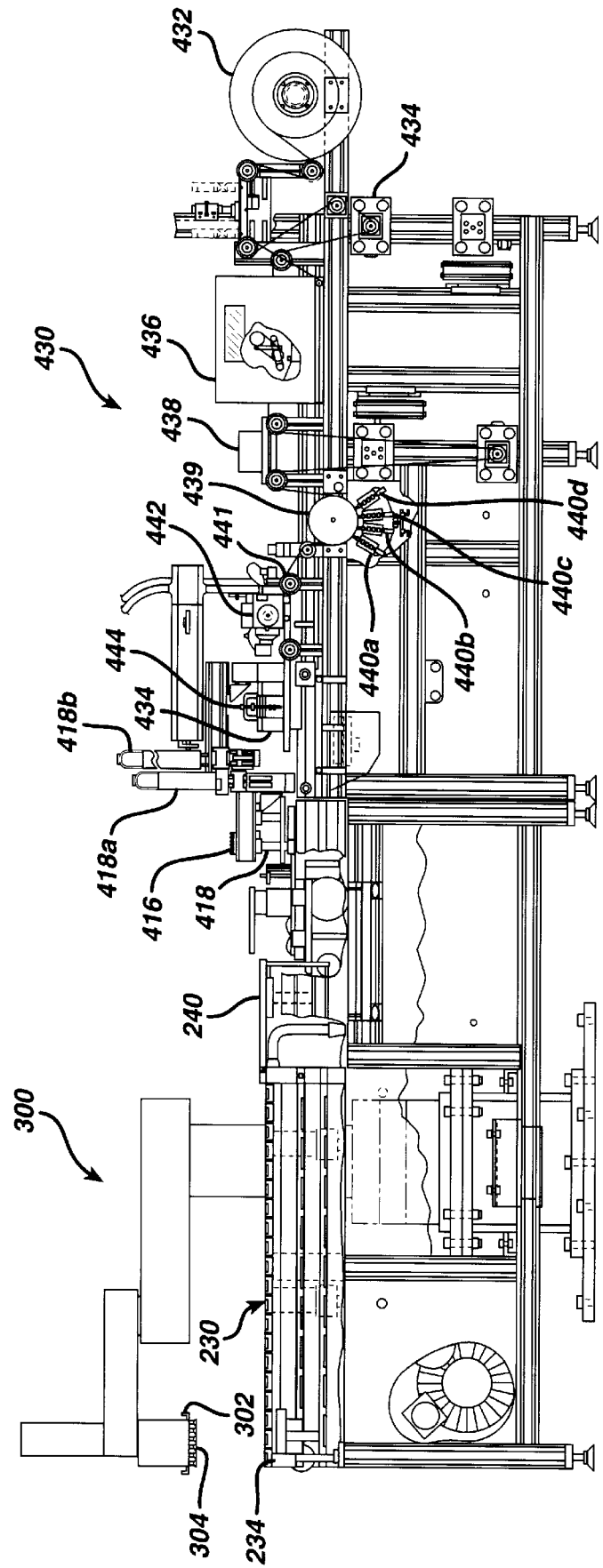
FIG. 4 is an elevation view of the consolidation buffer of the present invention, and the packaging apparatus to which the consolidated product flow is transferred.

As illustrated in FIG. 3, an injection mold machine 30 is used to mold the polypropylene package carriers 20 which serve a dual purpose in the invention concept. First, to provide a carrier for the inspection of the lens by the automated lens inspection system, and secondly, to provide a receptacle for the final packaging of the lens for distribution to end use consumers. These package carriers are molded in predetermined array, typically in clusters of sixteen per mold cycle, and removed from the injection mold by a robotic transfer means 60 having a rapidly reciprocating low mass transport carrier 62. The carrier 62 includes a hand member 64 having a plurality of vacuum gripper means thereon which are arranged to correspond to the array of mold cavities within the injection molding machine 20. Carrier 62 reciprocates along support member 26 and is rotatable from a vertical orientation as illustrated in FIG. 3, to a horizontal orientation necessary to place the packaged carriers into a secondary transfer shuttle 68. Secondary transfer shuttle 68 is used to transport a plurality, i.e. sixteen of the package carriers from a first receiving position 68(*a*) illustrated in FIG. 3 to a second position 68(b) where the package carriers are picked up by a robotic handling device 50. Robotic handling device 50 is articulated, having first and second arms 51,52 and a vertically reciprocating arm and hand (not shown) having a plurality of vacuum gripping means thereon which engage each of the package carriers transported by the transfer shuttle 68.

The package carriers 20 are then removed from the transfer shuttle 68 and placed on an inspection pallet 10 at a pallet loading station 11. In the preferred embodiment the package carriers are molded in a 4×4 array to maximize the efficiencies inherent in such an array for molding, which are transported in the inspection pallet 10 in a 2×8 array. When these two arrays are used, robotic handling device 50 makes two separate transfers, and transfers a 2×4 array in each transfer. The loaded pallet 10 is then moved by conveyor 12(*a*) to a deionized water injection station 16 wherein each of the package carriers transported on the inspection pallet are partially filled with degassed and deionized water. The inspection pallet is then transferred by a push conveyor 17 to a lens loading area 18 where it is batched with a second pallet to provide a contiguous loading area with thirty-two package carriers in a 4×8 array, each of which has been dosed with degassed and deionized water.

A first robotic transfer device 100 having a plurality of convex lens carrier elements 110 mounted thereon then removes thirty-two contact lenses from the preceding hydration station as described in U.S. Ser. No. 08/258,556, entitled "Automated Method and Apparatus for Hydrating Soft Contact Lenses", (Docket 8998). The robotic transfer device 100 includes an adjustable 4×8 array 102 of convex lens carriers 104 which pick up thirty-two lenses with a first 4×8 array, configuration, and deposits them in the batched array of thirty-two package carriers at staging area 18, with a single lens in each package carrier. The contact lenses are transferred from the hydration station to the individual convex lens carrier 100 with a gentle puff of air, and retained thereon by surface tension. The robotic transfer array 102 is paused at station 70 to remove any air bubbles entrapped in the residual deionized water that wets the lens. Station 70 includes a plurality of specially configured air nozzles which blow off the residual bubbles.

After the package carriers 20 have been loaded with a contact lens, the inspection pallets 10 are singulated by transport push plate 19 and loaded onto a first overhead conveyor 21. The overhead conveyor 21 then lifts the inspection pallet 10 from the lens loading area and transfers it to the automatic lens inspection system 15, and particularly to the conveyor 15(*b*) for transport through the automatic lens inspection system. After the lenses have been inspected, the inspection pallet is lifted by the second overhead conveyor 22 and placed on conveyor 12(*b*) for transport to the deionized water removal station 24. The deionized water is removed by a specially configured nozzle, as described in U.S. Ser. No. 07/999,234, entitled "Solution Removal Nozzle". The deionized water is used to hydrate and center the lens within the package carrier during the inspection process, but is removed prior to packaging, to enable a precise dosing of a buffered saline solution in the final package.

After removal of the deionized water, the lenses, package carriers and inspection pallet are transported to the package removal pick point 25 which clamps the inspection pallet 10 to enable the second robotic transfer device 200 to remove the package carriers and lenses therefrom.

A programmable logic controller maintains a status register for each of the lenses as they are placed at the robotic transfer staging area 18 and receives a flag from the automatic lens inspection station 15 for each lens that has failed inspection. The second robotic transfer device 200 includes a 2×8 array of independently actuable vacuum grippers which engage the package carriers at the package removal pick point 25. Any packages containing out of spec lenses are then dropped onto conveyor 14 by the robotic transfer device 200 as hereinbefore described, and the remaining lenses are transferred to the consolidation buffer 230 illustrated in FIGS. 4, 5, 8–12. The programmable logic controller is more fully described in U.S. Ser. No. 08/257,793 entitled Interactive Control System For Packaging Control, the disclosure of which is incorporated herein by reference thereto.

Figure 5:
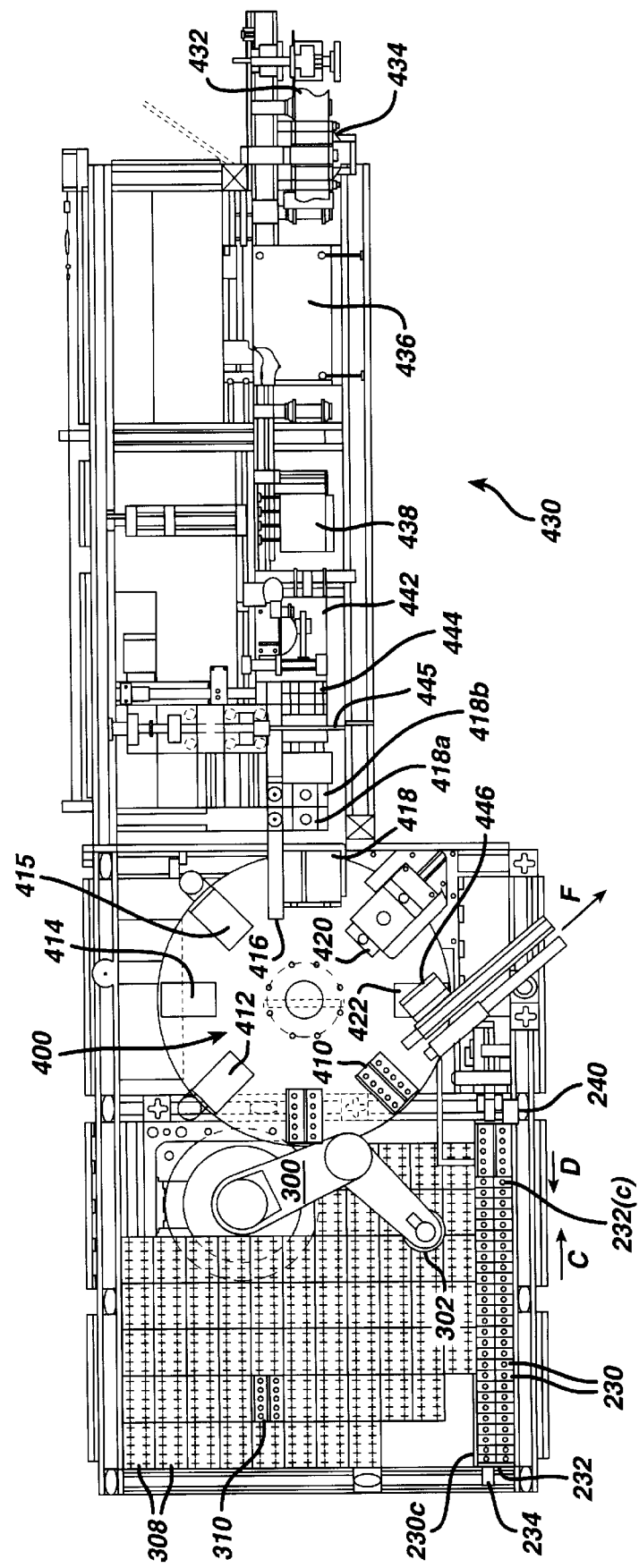
FIG. 5 is a plan view of the apparatus illustrated in FIG. 4 illustrating both a consolidation buffer and a packaging buffer arranged immediately prior to the packaging apparatus.
Figure 8:
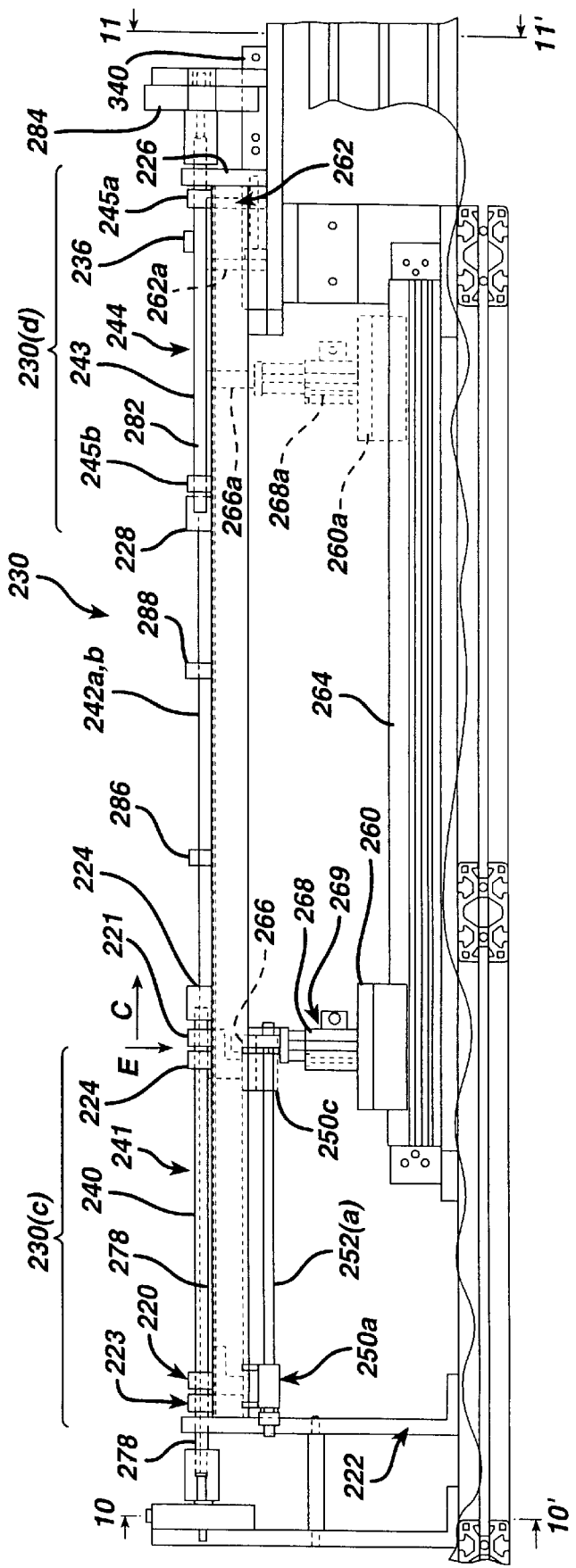
FIG. 8 is an elevation view of the consolidation buffer of the present invention.
Figure 12:
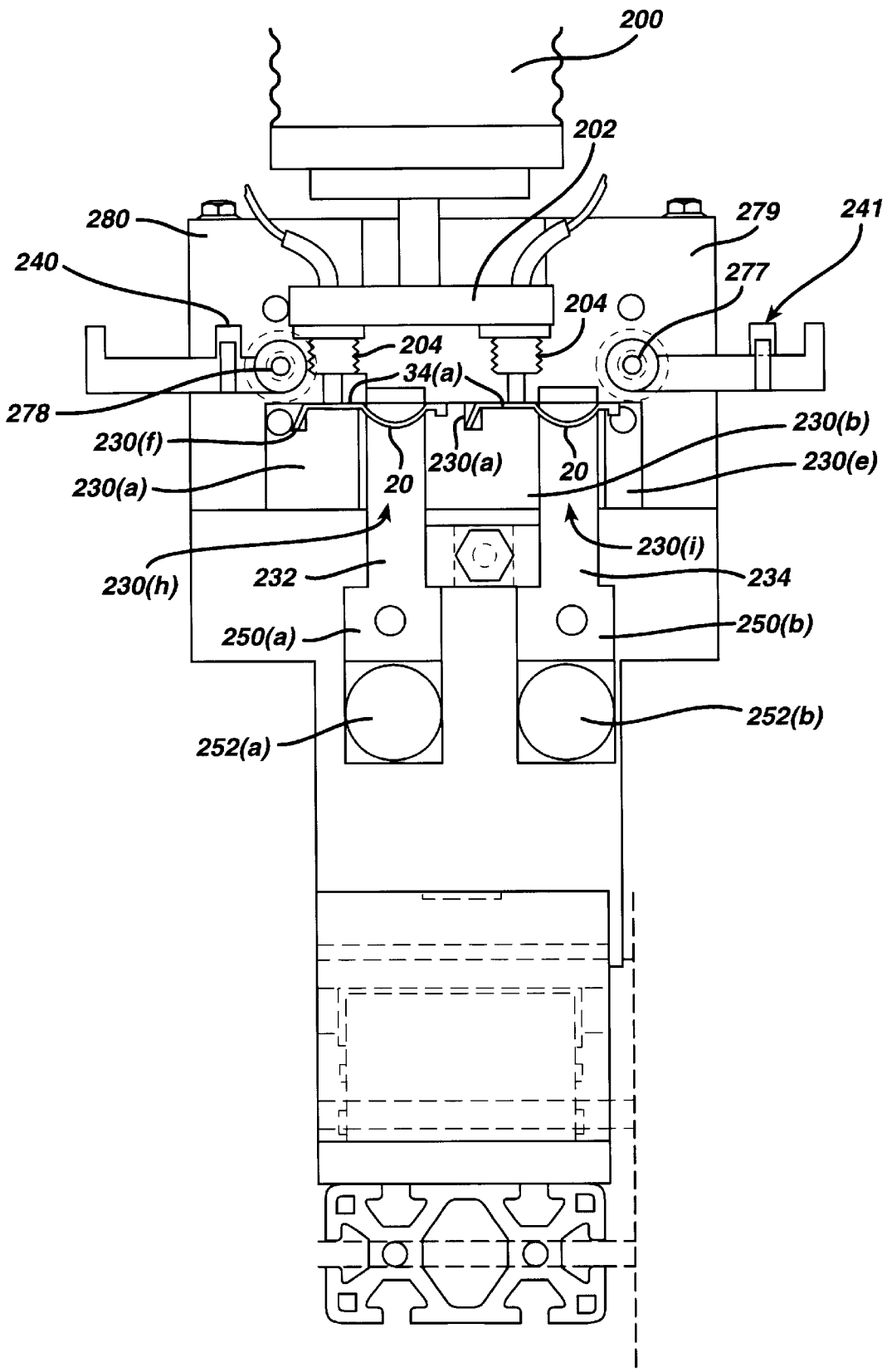
FIG. 12 is a diagrammatic illustration of an individuated robotic handling device transporting contact lens carriers to the consolidation buffer of the present invention.

The consolidation buffer 230 includes a pair of consolidation rails 230(*a*),(*b*), cross sections of which are illustrated in FIG. 12, which receive the 2×8 array of package carriers from the second robotic transfer means 200. This 2×8 array is deposited on the consolidation buffer 230 at position 230(*c*), as illustrated in FIG. 5 and 8. A pair of product followers 232,234 engage the string of package carriers and slide them in the direction of arrow C to a first staging area. A first consolidation of the initial load occurs during this transport. The strings of consolidated packages are then further transported in the direction of arrow C, in which the packages may engage other package carriers on the consolidation buffer. Eventually, the packages enter the final staging area where they trigger light sensors 236,238 as previously described. If they encounter existing package carriers, the intermediate followers 266, 267 will push the entire string in the direction of arrow A until each of the strings of package carriers has triggered its respective light sensor 236 or 238 as illustrated in FIG. 1. As the sensor is triggered, the PLC logic controller signals one or both pneumatic controllers to reverse the actuating air pressure for the air cylinders 268, 269 which actuate product followers 266, 267 thereby causing them to retract. A product indexing pusher 340 then returns the product string in the direction of arrow D to a fixed reference position where the package carriers can be readily engaged by the third robotic handling device 300. The Overhead guide rails are positioned just above the smooth planar area 34(*a*) of each package carrier 20 to hold the package carriers to the buffer and to prevent shingling thereof when being driven forward by product followers 232,234, 266 and 267 or indexing pusher 240.

The packaging robotic transfer device 300 includes a 2×5 array 302 of vacuum gripping means 304 which may engage ten of the package carriers at the position illustrated at 230(d) in FIG. 5 for transfer to the indexing turntable 400. The indexing turntable 400 includes a rotatable turntable having eight support pallets 410 mounted thereon for receiving the 2×5 array of package carriers and contact lenses from the packaging robotic transfer device 300.

In normal operation, the robotic transfer device 300 deposits the 2×5 array on support pallet 410 in the number 1 position. If the indexing turntable is not in operation, a large buffer area 308 is provided with a plurality of buffer pallets, one of which is indicated symbolically at 310 in FIG. 5. Buffer area 308 will accommodate approximately fifty pallets for intermediate storage, or approximately 10 minutes of product stream in the event the packaging operation is temporarily interrupted for resupply, maintenance or adjustments.

After the 2×5 array of package carriers has been deposited on support pallet 410, the pallet is rotated to position 412 where optical sensors verify that a package has been loaded at each position and that the packages are correctly aligned on the pallet. Indexing turntable 400 is then rotated again to station 414 wherein each of the individual package carriers are dosed with approximately 950 microliters of a buffered saline solution. The use of deionized water in the hydration and inspection steps significantly speeds the production line as a whole since the time consuming ionic neutralization of the polymer from which the lenses are made does not occur until after the inspection process. When deionized water is used for hydration and inspection, the final step of the process is to introduce buffered saline solution into the final package with the lens and then seal the lens within the package so that final lens equilibration (ionic neutralization, final hydration and final lens dimensioning) is accomplished in the package at room temperature or during sterilization after the lens has been packaged and sealed.

It has been determined empirically that it is desirable that soft contact lenses produced in accordance with the present invention be exposed to atmosphere for no more than fifteen minutes between the removal of the deionized water at station 24 (illustrated in FIG. 3) and the dosing of the saline solution at station 414 in FIG. 5. The programmable logic controller which previously received the inspection results from the automated lens inspection system and correlated those results to the individual lenses, also time stamps the individual lenses at the pick up point 25, immediately following the removal of the deionized water at station 24. This time stamp is transferred through consolidation and into the 2×5 array when removed by the packaging robotic transfer device 300. In the event the indexing turntable 400 is not operational, and the 2×5 array is stored in the buffer 308, then the X,Y coordinates of the 2×5 array are stored with the time stamp to enable the packaging robotic transfer device 300 to select "fresh" product, i.e. less than fifteen minutes old, at the time the indexing turntable 400 resumes operation. After operation is resumed, the robotic transfer device 300 will then dispose of the "expired" product, rather than transferring it to the indexing turntable.

After saline dosing at station 414, the saline level is checked at station 415 and the support pallet is then rotated under a final product check station 416 to a foil receiving station 418.

As described earlier, each group of package carriers 20 receives a single laminated foil cover sheet which is heat sealed to the package carriers. The lens package is more fully described in U.S. Ser. No. 08/257,796, entitled "Packaging Arrangement for Contact Lenses", also assigned to the assignee of the present invention, the disclosure of which is incorporate herein by reference thereto. The laminated foil stock 432 is fed from a large indefinite spool through a tensioning device 434 to an ink jet printer 436 which prints the lot, batch and power number of the lenses to be packaged. The foil laminate is cut from an indefinite length product into two strips that are heat sealed to the 2×5 product array to provide two separate 1×5 product strips. The foil in between each of the package carriers is also partially severed, scored or perforated to enable the consumer to separate individual packages from the 1×5 array at the time the product is used. The partial scoring is done with a series of rolling blades 440(a)–(d) which are pneumatically biased into a drum 439. The foil is then split into two strips by a foil slitter blade 441 and the foil passes through a stationary gripper and sensing mechanism 442. A video camera 438 and a series of sensors at station 442 are used to provide precise alignment of the information printed by the ink jet printer 436, with the printing fields into which said printing is placed, and the alignment of the perforations or scores provided by rolling blades 439. An advancing gripper 434 is provided to draw a length of foil laminate corresponding to the 1×5 array and sever the strips with a rotating knife 444. At the completion of this cut, the advancing gripper 434 has advanced in the direction of arrow E in FIG. 4 to place the 1×5 foil strips under vacuum gripping heads 418 (a), (b). These vacuum gripping heads then reciprocate downwardly to grip the foil, lift it from the advancing and cutting station 434, and transfer the foil to the indexing turntable 400 at the foil placement station 418.

The indexing turntable 400 is then rotated again, and a heat seal mechanism 420 seals a single strip of foil to five separate package carriers in a single high temperature short cycle sealing operation. Indexing turntable 400 is then rotated to position 422 where a reciprocating transfer head 446 removes the sealed product from the indexing turntable 400 and transports it in the direction of arrow F for sterilization and cartoning.

The Consolidation Buffer

The consolidation buffer of the present invention will be described with respect to FIGS. 8–12 in which 230(a),(b) represent a pair of elongated buffer rails and an elongate side rail 230(e).

As illustrated in FIG. 12, the second robotic transfer device 200 includes a 2×8 array 202 of independently actuable vacuum gripping means 204 which pick a 2×8 array of package carriers from pick point 25, immediately following the removal of the deionized water as previously described with respect to FIG. 3. The 2× 8 array is then moved to position 230(c) as illustrated in FIG. 5 and 8, and as illustrated in cross-section in FIG. 12 wherein the individual package carriers 20 are positioned immediately above the buffer rails, and then lowered into engagement therewith, to enable the buffer rails to engage the smooth planar surfaces 34(a) of the package carrier 20. The vacuum gripping means 204 are then released, depositing the array of packages on buffer rails 230(a), 230(b).

Figure 9:
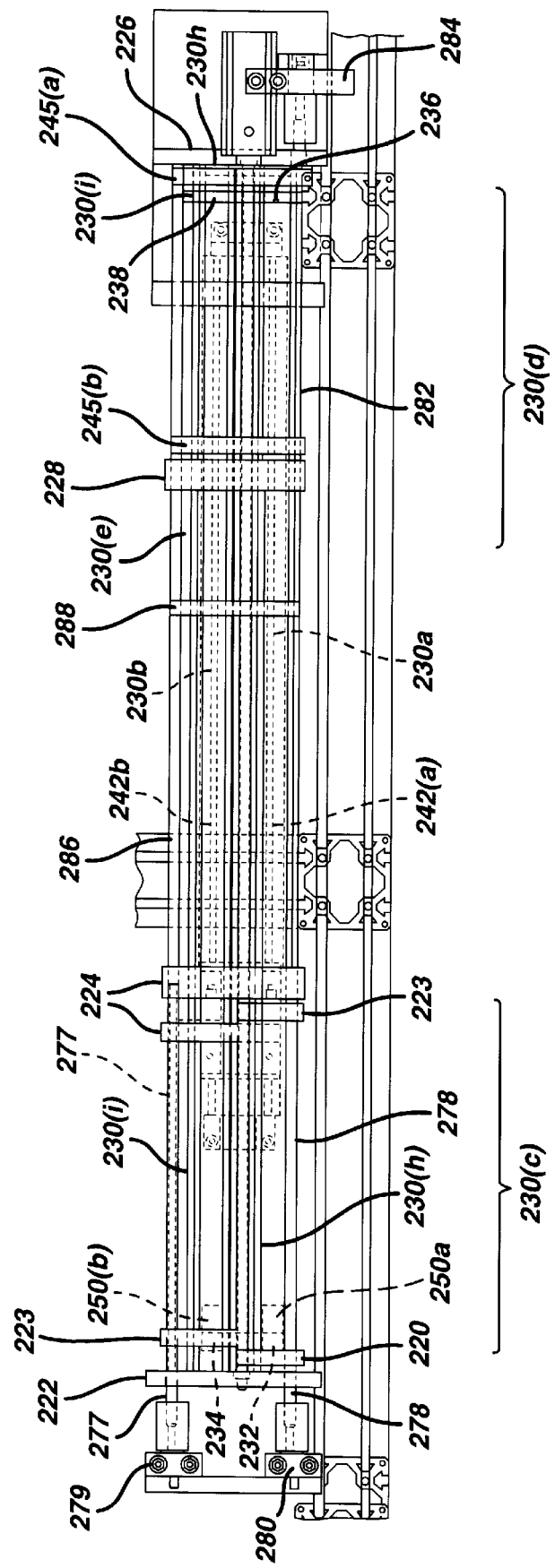
FIG. 9 is a plan view of the consolidation buffer of the present invention, as illustrated in FIG. 8.
Figure 10:
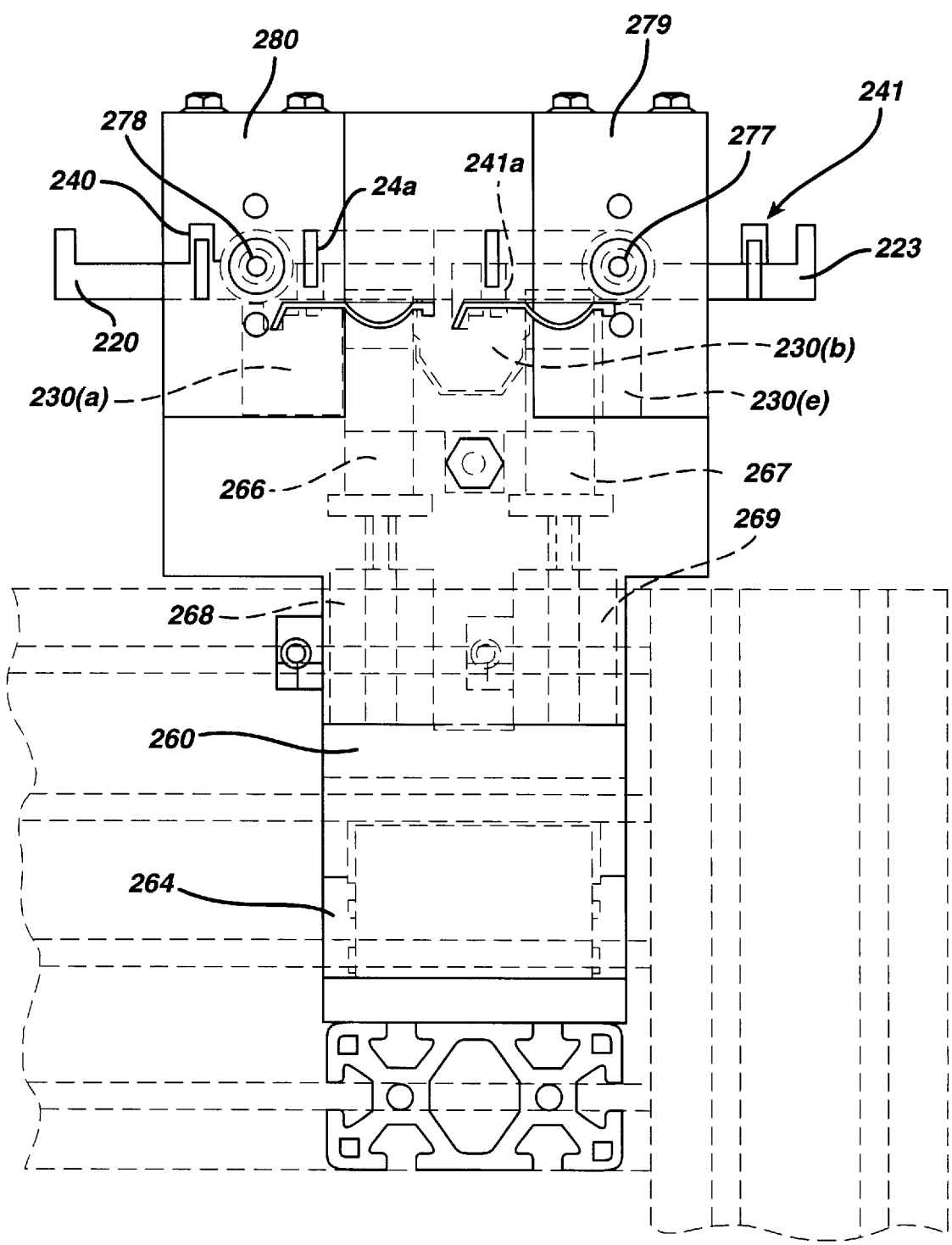
FIG. 10 is a cross-sectional elevation view of the apparatus illustrated in FIG. 8, taken along section line 10–10'.
Figure 11:
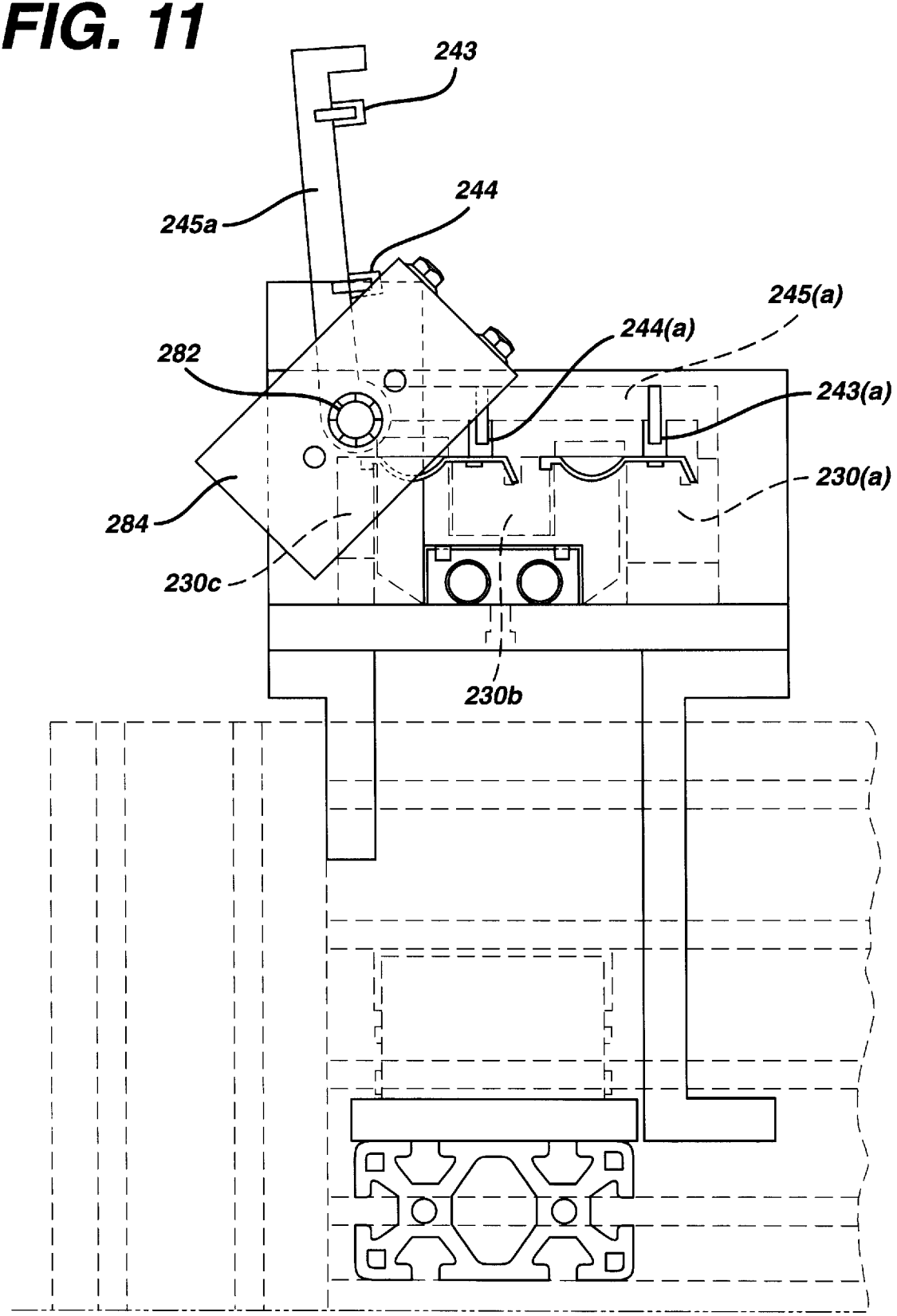
FIG. 11 is a cross-sectional elevation view of the apparatus illustrated in FIG. 8, taken along section line 11–11'.

The buffer rails 230(a), (b) include three sections, a loading section denoted as 230(c) in FIGS. 8 and 9, an intermediate section and an end section or package lift off area indicated at 230(d) in FIGS. 8 and 9. The packages are deposited on the buffer rails 230(a), (b) as illustrated in FIG. 12, and then transported the length of the buffer rail by one or more pneumatic product followers. Inasmuch as the packages transported by the present invention, generally indicated in FIG. 6, are thin and light weight, there is a tendency for the packages to "shingle" during transport. This problem was addressed in the parent application by the use of vacuum rails which exerted a light pressure from below to maintain the packages in contact with the buffer rails. In the present invention, this function is preformed by a series of hold down rails divided into three sections. In the first section denoted as 230(c) a pair of moveable guide rails 240, 241 are used to hold down the packages during initial transport and consolidation. These guide rails pivot up and out of the way during loading of the packages as illustrated in FIGS. 10 and 12. In the intermediate section of the consolidation buffer 230, the guide rail members 242(a), 242(b) are fixed, with a 0.5 mm clearance above the nominal height of the package. This clearance provides for adequate transport of the packages without allowing shingling thereof. A third pair of hold down bars 243, 244 are nominally maintained in the lower position illustrated in FIGS. 8 and 9 when the package arrays are received, but open for package lift off as illustrated in FIG. 11.

The packages are transported the length of the buffer rail by at least one pneumatic product follower, which was illustrated in the parent application as a pair of rodless cylinders. While a single drive, traversing the entire length of the consolidation buffer 230 has proved to be adequate and satisfactory, the consolidation buffer 230 illustrated in FIGS. 8 and 9 uses a two stage drive that provides a faster cycle rate, thereby allowing a higher throughput for the consolidation function.

As illustrated in FIG. 8 and 12, the first stage drive is indicated by a rodless cylinders 250(a), 250(b) which travel on pneumatic guide rods 252 (a), 252 (b) throughout the length of the input zone 230(c). A second rodless cylinder drive mechanism 260 is used to transport the consolidated packages the remaining length of the buffer 230 into the package lift off zone 230(d). Suitable rodless pneumatic drives are available from S.M.C. Pneumatics, Inc. a Japanese Corporation having sales offices in Chicago, Ill.

After triggering infra red sensors, 236, 238 the consolidated package array is moved back into position by a return stroke from indexing pusher 240 and package return plates 262 (a), (b) as will be hereinafter explained in greater detail. The rodless cylinder 260 travels a fixed guide rail 264 and includes a pair of pneumatically engageable package engaging followers 266, 267 which are reciprocated upwardly to engage the package string for transport in the direction of arrow C, and then retracted during the return stroke to enable an advancing package array to be transported over the engagement point E. Each of the package followers 266, 267 is mounted on a separate pneumatic cylinder 268, 269 which are fixed to the carriage 260 of a rodless cylinder which reciprocates along rail 264. Each of the package followers 266, 267 travel in a space defined between the two buffer rails 230(a), 230(b) as illustrated in FIG. 10. The limits of travel of the reciprocating carriage 260 is illustrated in FIG. 8 with the initial or home position of the carriage 260 illustrated in solid lines, and the nominal end stroke position illustrated in dotted lines at 260 (a). As illustrated in FIG. 8, the pneumatic cylinder 268 (a) has elevated the package follower 266 (a) to its upward package driving position. The sensor array 236, 238 mounted in bridge 270 signals when the leading edge of the consolidated package array reaches the end of travel of the consolidating rails 230 (a), 230 (b). Infra red sensors are used, and generate a signal for the PLC the controller halts the advance of the carriage 260 and the PLC begins the return stroke to the home position illustrated in FIG. 8 when both sensors have triggered, or when carriage 260 reaches its end of stroke position.

After the rodless carriage 260 begins at return stroke, a pneumatic cylinder 340 (the index pusher) advances package plate 262 in a direction opposite to the arrow C to return a consolidated package array to a predefined registration point for pick up by the 2×5 package array 302 as previously described with respect to FIG. 1. The pneumatic drive 340 advances the package return plate 262 to the position illustrated at 262(a) in FIG. 8 to align the first 2×5 array in a predetermined position for robotic pick up, and then returns to the position illustrated at 262.

Shingling of the package carriers is prevented by means of a longitude vertical restraining guides 240 and 241, 242(a), (b) and 243, 244 as will be hereinafter explained with respect to FIGS. 8–12. In the load section 230(c) a pair of guides 240, 241 are mounted for pivotal movement on shafts 277, 278 and are rotated by rotary actuators 279, 280 from the position illustrated in FIG. 12 to the dotted line position 240(a), 241(a) illustrated in FIG. 10. The rotary reactors 279, 280 may be pneumatically, hydraulically or electrically powered, but in the preferred embodiment are pneumatically driven.

As illustrated in FIG. 12, when the robotic head 202 drops the inspected package array on to the consolidating buffer 230, the respective array of packages are arranged to be supported on a rail which extend the length of the consolidating buffer. Each of these rails define longitudinal cut out 230(f) and 230(g) which receive the downwardly sloping angled flange member 38 illustrated in FIG. 6. The bowl member 36 of one string of package is 20 is received in a space 230(h) define between the first buffer rail 230(a) and the second buffer rail 230(b). The bowl member 36 of the second string of packages is received in a second space 230(i) define between the second buffer rail 230(b) and an elongate support rail 230(e). After the package carriers 20 have been deposited in the position illustrated in FIGS. 10–12, the robotic device 200 is retracted and the rotary actuators 279, 280 actuated to rotate guide members 240 and 241 into a position over the flat planar portion 34 (a) of package carriers 20. Once the doors have been rotated into position, the rodless carriers 250(a), 250(b) begin their advancing stroke in the direction of arrow C illustrated in FIG. 8 to consolidate the array, and move it to the hand off point E illustrated in FIG. 8. After the rodless cylinders 250(a), 250(b) have completed their stroke as indicated by the dotted line illustration 250 (c) in FIG. 8, they return to their home position to await a new array of product. During this advancing stroke, the package array has been consolidated and advanced from the moveable vertical guides 240, 241 to a position beneath the fixed vertical guides 242(a), (b). During this stroke, the package follower 232 has traveled in the space 230(h)defined between the buffer rails 230(a) and 230(b) while the package follower 234 has traveled in the longitudinal space between buffer rail 230(b) and the vertical support 230(e).

At the hand off point E, the package followers 232, 234 have advanced the entire consolidated array past the hand off point E so that when the pneumatical cylinders 268, 269 are actuated, the second set of package followers 266, 267 are advanced upwardly behind the consolidated array. The entire array is then advanced under the fixed vertical guides 242(a), (b) in the direction of arrow (c) to the end position or hand off position indicated at 230(d) of FIG. 8.

At the hand off position, the two vertical package guides 243, 244 are mounted on a single rotary arm 245 which is pivotally mounted on shaft 282 which is rotated by rotary actuator 284 from the position illustrated in FIG. 11, to the dotted line position 243(*a*), 244(*a*) illustrated in FIG. 11. It should be noted that FIG. 11 views the consolidating buffer 230 from the opposite direction as FIG. 10. As described previously, the advancing array of consolidated packages passes under an infra red sensor array 236, 238 which generates a signal for the PLC controller to individually retract the package followers 266, 267 to thereby halt the advancing array of packages and to return the rodless cylinder 260 is then returned to its home position after both package arrays have reached sensors 236, 238. Simultaneously, pneumatic cylinder 340 begins its index stroke to return the consolidated array to the pick up position for pick up by the robotic head 302 as previously described with respect to FIG. 1. While the return cylinder 340 is positioning the package array, the rotary actuators 284 rotates shaft 282 and the support arm 285 thereby lifting the vertical guides 243, 244 free of the packages 20 enabling pick up by the 2×5 robotic head 302. After the robotic head has cleared the 2×5 array from the package lift off 230(*d*) the rotary actuator 284 rotates shaft 282 to bring the cross member 245 and the vertical restraining guides 243, 244 back into position over the buffer rails 230 (*a*) 230(*b*).

Vertical guide 240 in the input section of the consolidation buffer is mounted on a pair of rotating arms 220, 221 on shaft 278 which is journalled for rotation in the support frame member 222 and bridge member 224. Likewise, the moveable vertical guide 241 is mounted between a pair of rotating arms 223, 224 which are supported by shaft member 277 which is journalled for rotation in frame member 222 and bridge member 224. The fixed vertical restraint guides 242 (*a*), (*b*) are fixably supported by bridges 286 and 288. The package lift off vertical restraint guides 243, 244 are supported by arm members 245(*a*), 245(*b*) and shaft member 282 which is journalled for rotation in the frame support member 226 and bridge member 228.

While the invention has been particularly shown and described with respect to the preferred embodiments thereof, it will be understood by those skilled in the art that the foregoing, and other changes in form and details, may be made therein without departing from the spirit and scope of the invention, which is limited only by the scope of the following claims.

We claim:

1. An automated apparatus for controlling the automatic packaging of contact lenses in a contact lens fabrication facility having a contact lens inspection station performing a contact lens quality control evaluation, said apparatus comprising:

(a) a first robotic transfer device for periodically transferring a first predetermined array of individual packages from said inspection station to a consolidation buffer;

(b) a controller for tracking and identifying individual packages containing contact lens inspected at said inspection station, said controller including memory and logic for storing the identity of individual packages containing contact lenses determined to be out of specification in accordance with said quality control evaluation and generating a signal to cause said first robotic means to elect any said individual package identified by said controller as being out of specification while transferring said first predetermined array, said individual ejections creating said random variations in said first predetermined array of packages;

(c) said consolidation buffer having at least one elongate buffer rail for receiving said first predetermined array less any individual packages identified as being out of specification and at least one product follower for each rail to consolidate any remaining individual packages deposited thereon from said first predetermined array into a second predetermined array; and, (d) a second robotic assembly for periodically transferring said second predetermined array of individual packages from said consolidation buffer to a second processing station.

2. An automated apparatus for controlling the automatic packaging of contact lenses as claimed in claim 1, wherein said controller further includes logic for determining whether said second processing station is available to receive said second predetermined array of packages in any period, said controller further enabling said second robotic assembly to transfer said second predetermined array of packages to an intermediate storage area when it is determined that said second processing station is not available to receive said second predetermined array of packages in said one period.

3. An automated apparatus for controlling the automatic packaging of contact lenses as claimed in claim 1 wherein said consolidation buffer includes a first input section having a first product follower, and a second intermediate buffer section having a second product follower which transports consolidated product to an end section.

4. An automated apparatus for controlling the automatic packaging of contact lenses as claimed in claim 2, wherein said controller further includes a timer for generating first time stamp data for each identified package in said first predetermined array of packages prior to transferring said first predetermined array from said inspection station.

5. An automated apparatus for consolidating serial product flow wherein said product flow includes a series of discrete product units, said apparatus comprising:

(a) at least one serial product line having random variations in serial product flow;

(b) a consolidation buffer for receiving said serial products from said line, at least one product follower for consolidating random variations in said product flow and guide means to prevent product shingling;

(c) an automated output device for selecting a predetermined number and arrangement of product units, and transporting said number and arrangement to a subsequent processing station.

6. An automated apparatus as claimed in claim 5 wherein said apparatus further comprises a robotic transfer device for receiving said serial product flow, and ejecting individual product units in response to a quality control evaluation, said individual ejections creating said random variations in said product flow.

7. An automated apparatus as claimed in claim 5 wherein said predetermined arrangement of output units includes an X,Y array of units, and said consolidation buffer includes at least X number of individual product buffers.

8. An automated apparatus as claimed in claim 7 wherein said apparatus further comprises a control means which stores a status for each of said individual product buffers, including a count for each random addition of product, and a count for each selection and transport by said automated output means.

9. An automated apparatus as claimed in claim 8 wherein said robotic transfer device will transfer products between individual buffers to ensure said X,Y array of units for said automated output device.

10. An automated apparatus as claimed in claim 6 wherein said robotic transfer device includes an array of independently actuable vacuum gripping means.

11. An automated apparatus for controlling the automatic packaging of contact lenses in a contact lens fabrication facility having a contact lens inspection station performing a contact lens quality control evaluation, said apparatus comprising:

(a) a first robotic transfer device for periodically transferring a first predetermined array of individual packages from said inspection station to a consolidation buffer, said first predetermined array having random variations in said array;

(b) a controller for tracking and identifying individual packages containing contact lens inspected at said inspection station, said controller including memory and logic for storing the identity of individual packages containing contact lenses determined to be out of specification in accordance with said quality control evaluation and generating a signal to cause said first robotic transfer device to eject any said individual packages identified by said controller as being out of specification while transferring said first predetermined array, said individual ejections creating said random variations in said predetermined array of packages;

(c) said consolidation buffer receiving said first predetermined array with random variations, said buffer having at least one product follower for consolidating random variations in said product array and a guide means to prevent product shingling of said individual packages when consolidated;

(d) an automated output device for selecting a predetermined number and arrangement of individual packages, and transporting said number and arrangement to a subsequent processing station.

12. An automated apparatus as claimed in claim 11 wherein said predetermined arrangement of individual packages includes an X,Y array of individual packages, and said consolidation buffer includes at least X number of individual product buffers.

13. An automated apparatus as claimed in claim 12 wherein said apparatus further comprises a control means which stores a status for each of said individual product buffers, including a count for each random addition of individual packages, and a count for each selection and transport by said automated output means.

14. An automated apparatus as claimed in claim 13 wherein said robotic transfer device will transfer individual packages between individual ones of said x number of buffers to ensure said X,Y array of packages for said automated output device.

15. An automated apparatus as claimed in claim 6 wherein said robotic transfer device includes an array of independently actuable vacuum gripping means.

16. An automated apparatus for controlling the automatic packaging of contact lenses as claimed in claim 11, wherein said controller further includes logic for determining whether said subsequent processing station is available to receive said second predetermined array of packages in any period, said controller further enabling said second robotic assembly to transfer said second predetermined array of packages to an intermediate storage area when it is determined that said second processing station is not available to receive said second predetermined array of packages in said one period.

17. An automated apparatus for controlling the automatic packaging of contact lenses as claimed in claim 16, wherein said controller further includes a timer for generating first time stamp data for each identified package in said first predetermined array of packages prior to transferring said first predetermined array from said inspection station.

* * * * *

UNITED STATES PATENT AND TRADEMARK OFFICE
CERTIFICATE OF CORRECTION

PATENT NO. : 5,855,104
DATED : 1/5/99
INVENTOR(S) : Schlagel, et al.

It is certified that error appears in the above-indentified patent and that said Letters Patent is hereby corrected as shown below:

Column 13 - Line 61 - delete "elect" and insert --eject--.

Signed and Sealed this

Twenty-ninth Day of June, 1999

Attest:

Q. TODD DICKINSON

*Attesting Officer*  *Acting Commissioner of Patents and Trademarks*